United States Patent [19]

Leisinger et al.

[11] Patent Number: 5,583,322
[45] Date of Patent: Dec. 10, 1996

[54] TOP LOADING PRECISION BALANCE WITH A DRAFT PROTECTION DEVICE COMPRISING A PIVOTABLE COVER

[75] Inventors: Roger Leisinger, Zurich; Bruno Mattle, Uster, both of Switzerland

[73] Assignee: Mettler-Toledo AG, Greifensee, Switzerland

[21] Appl. No.: 119,990

[22] Filed: Sep. 10, 1993

[30] Foreign Application Priority Data

Feb. 9, 1993 [CH] Switzerland .................. 402/93

[51] Int. Cl.$^6$ .................. G01G 21/00; G01G 21/28
[52] U.S. Cl. .................. 177/180; 177/126; 177/238; 24/455; 16/342; 220/264; 220/336; 312/263; 312/319.2; 403/316; 403/327
[58] Field of Search .................. 312/114, 319.1, 312/319.2, 263; 24/287, 455; 403/111, 316, 318, 319, 326, 327, 329; 177/180, 181, 238, 126; 16/342, 337; 220/264, 336, 337, 339

[56] References Cited

U.S. PATENT DOCUMENTS

| 3,250,585 | 5/1966 | McQuarrie et al. | |
|---|---|---|---|
| 3,498,207 | 3/1970 | Hazen . | |
| 3,810,275 | 5/1974 | Smith | 220/307 X |
| 3,941,300 | 3/1976 | Troth | 16/306 X |
| 4,148,106 | 4/1979 | Gallien | 403/316 X |
| 4,356,594 | 11/1982 | Grosemans | 16/342 X |
| 4,862,978 | 9/1989 | Borchard | 177/180 |
| 4,921,058 | 5/1990 | Pally et al. | 177/181 |
| 5,253,391 | 10/1993 | Ojima | 16/289 |

FOREIGN PATENT DOCUMENTS

| 0046821 | 3/1982 | European Pat. Off. . |
| 0282400 | 9/1988 | European Pat. Off. . |
| 8907396 | 9/1989 | Germany . |
| 578106 | 7/1976 | Switzerland . |

Primary Examiner—Brian W. Brown
Assistant Examiner—Randy W. Gibson
Attorney, Agent, or Firm—Friedrich Kueffner

[57] ABSTRACT

A top-loading precision balance with a draft protection device which includes several walls connected to each other at the edges thereof, and a cover which closes the opening defined at the top of the walls. The cover is fastened through a horizontally extending hinge to one of the walls. The hinge of the cover includes a spring which acts against the direction of movement for closing the cover. The spring mounted in the hinge is a torsion spring which is fixed at both ends thereof. The frame forming the bottom of the draft protection device has on its bottom side a groove into which lugs mounted on the balance housing engage when the draft protection device is placed on the balance housing. A spring is fastened at the groove of the frame under the front side of the draft protection device. The spring engages in a groove of one of the lugs.

14 Claims, 3 Drawing Sheets

TOP LOADING PRECISION BALANCE WITH A DRAFT PROTECTION DEVICE COMPRISING A PIVOTABLE COVER

BACKGROUND OF THE INVENTION

1. Field of the Invention

The present invention relates to a top-loading precision balance with a draft protection device which includes several walls which are connected to each other at the edges thereof and a cover which closes the opening defined at the top of the walls and is pivotally fastened by means of a horizontally extending hinge.

2. Description of the Related Art

Precision balances with a draft protection device of the above-described type are known in the art. Thus, Swiss Patent 677,029 describes a draft protection device whose side walls are connected to each other at the edges thereof by means of section bars and which can be closed at the top by means of a cover hinged to one of the side walls. The known draft protection device rests as a result of its own weight on the balance housing and is not otherwise fastened to the balance housing. The cover is connected in a simple manner by means of a hinge to the rear side wall of the draft protection device. In order to enable viewing through the draft protection device, the side walls as well as the cover are of glass. The cover projects only slightly beyond the side walls and is relatively heavy. Thus, since the cover must be opened each time the balance is loaded, the cover may slide out of the hand of the operator by incorrectly handling the cover and, consequently, the cover may drop onto the upper edges of the sidewalls. This results in the danger that the glass cover may break. Another disadvantage of this draft protection device is the fact that, because of the high weight of the cover, frequent opening and closing of the cover in the case of a large series of weighing procedures will lead to fatigue of the person operating the balance.

Another disadvantage of the known draft protection device is that the draft protection device may be lifted in the front thereof when the heavy cover is swung up and, in the worst case, the draft protection device may tilt back from the upper surface of the balance housing.

SUMMARY OF THE INVENTION

Therefore, it is the primary object of the present invention to provide a top-loading precision balance of the above-described type with a draft protection device which is easier to operate, and which in particular facilitates a secure and breakage-free opening and closing of the cover.

In accordance with the present invention, the hinge of the cover includes a spring which acts against the direction of movement for closing the cover.

The spring mounted in the hinge of the cover not only dampens the impact of the cover on the upper edges of the side walls, but it also supports a substantial portion of the weight of the cover, so that the cover can be easily raised and lowered in a dampened manner. Consequently, the cover is not only protected against breakage, but operation of the draft protection device by the user is simultaneously substantially simplified.

In accordance with a feature of the present invention, the spring mounted in the hinge is a torsion spring which is fixed at both ends thereof. As a result, a symmetrical load is applied to the hinge parts which form the hinge or hinges and are connected to the cover and the side walls. The torsion spring can be accommodated in a very small space within the hinge, so that the spring does not impair the aesthetic appearance of the hinge. The torsion spring, which may be a torsion rod spring, may be placed during assembly without pre-tensioning into the opened cover. If the spring is fixed only at the two ends thereof, i.e., one end of the spring is fixed to the cover and the other is fixed to the side wall, a central support device is not required. If the spring mounted in the hinge is a rectangular spring, i.e., a plate spring loaded for torsion, the spring can be fastened by simply inserting the ends thereof into slot-shaped recesses in bearing bolts forming the hinges or pivot bearings. Flat portions of the bearing bolts prevent rotation of the bolts within the hinge. The force of the spring can be transmitted to the rear wall by means of a simple support device, i.e., a slotted stirrup, which is arranged on the stationary hinge part connected to the wall.

If a helical spring is used, this spring can be slid, also in the untensioned state, onto the axis of rotation or shaft of the hinge. When the cover is closed, the two tangentially projecting ends of the spring come into contact with the cover and the side wall, respectively. A separate guidance of the spring is not required.

In order to further improve the properties of the draft protection device, the device may include means for securing it onto the balance housing when the cover is opened.

The means for securing the draft protection device to the balance housing may include a spring mounted in a groove-like recess at the bottom side of the frame of the draft protection device which, when the draft protection device is placed on the balance housing, automatically engages in a lug or rib provided on the balance housing, or in a groove or step provided in the rib. As a result, even when the cover is incorrectly operated, the draft protection device can no longer tilt backward. On the other hand, the draft protection device can be lifted without tools from the balance housing in a simple manner by raising the rear portion thereof and slightly swinging the draft protection device about the forward lower edge of the frame of the draft protection device. If the cross-section of the draft protection device is square, it may also be placed on the balance housing turned by 90° and locked into the ribs or lugs provided at the sides. The cover can then be swung open sideways and the operation, i.e., loading of the weighing dish, can also be carried out from the side. The spring mounted on the frame of the draft protection device for locking it is composed of a flat spring steel, one end of which is connected to the frame and the other end is arranged so as to project at an acute angle into the groove-shaped recess of the frame.

In accordance with another feature, a pin may be provided which extends horizontally through and is located transversely of the groove in the frame, wherein the pin engages in a slot which is inclined relative to the horizontal.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DESCRIPTION OF THE PREFERRED EMBODIMENTS

Figure 1:
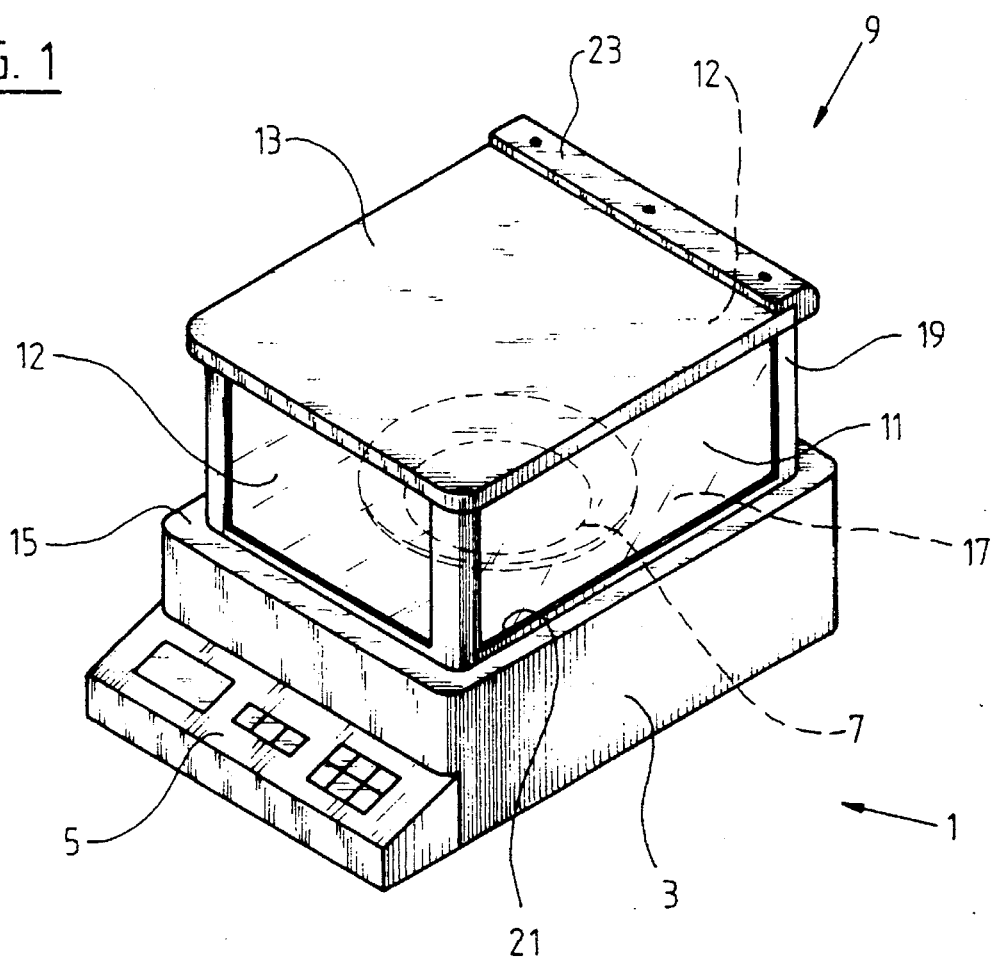
FIG. 1 is a perspective view of the top-loading precision balance with draft protection device according to the present invention.

As illustrated in the perspective view of FIG. 1 of the drawing, a top-loading precision balance 1 includes a housing 3, an indicating and operating unit 5 as well as a weighing dish 7, shown in broken lines.

A draft protection device 9 is placed on the housing 3. The draft protection device 9 has two side walls 11 and front and rear walls 12 and a cover 13. The draft protection device 9 may be placed directly on the upper surface 15 of the balance housing 3 or on a support plate 17 which is fastened to the housing 3. The support plate 17 positions the draft protection device 9 on the upper side of the balance housing 3.

The four walls 11, 12 of the draft protection device 9 are connected to each other at the vertical edges thereof by means of guide sections 19. The sections 19 are connected to the corners of a rectangular frame 21 which forms the bottom of the draft protection device 9. Guide grooves for receiving the edges of the walls 11, 12 are provided in the guide sections 19 and in the frame 21. Preferably, the walls 11, 12 are of glass.

The cover 13 is pivotally connected to the rear wall 12 by means of a hinge 23. The hinge 23 has a pivot part 25 which is connected to the cover 13, and a support part 27 which is connected to the rear wall 12. The pivot part 25 has at the ends thereof bearing blocks 29, wherein each bearing block 29 supports a bearing bolt 31. If the hinge 23 is made of plastics material, the bearing blocks 29 are preferably box-shaped, such that the bearing bolts 31 are supported at two points. Pairs of ribs 33 are preferably molded onto the outwardly directed sides of the bearing blocks 29 for securing the bearing bolts 31 whose heads 35 are provided with flat portions.

The front ends of the bearing bolts 31 extend through the lateral end walls 37 of the box-shaped support part 27 and include means for securing a torsion spring 39 which is placed between the two bearing bolts 31. If the torsion spring 39 is a plate spring, the holding means or receiving means in the bearing bolts 31 are slot-shaped recesses 41. A stirrup 43 is fastened by means of a screw or rivet 45 to the support part 27 between the lateral end walls 37 for receiving the ends of the bearing bolts 31. The two sides of the stirrup 43 have slots for passing the torsion spring 39 therethrough.

The cover 13 is securely fastened to the pivot part 25 by means of screws or rivets 47, or by gluing or welding. The rear wall 12 is fastened to the support part 27 by means of screws 49.

Figure 2:
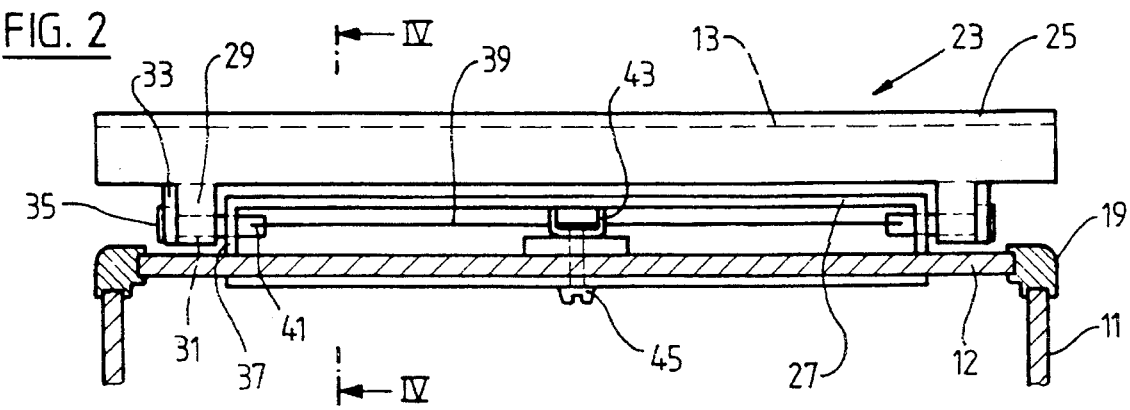
FIG. 2 is a bottom view, on a larger scale, showing the hinge of the draft protection device with the cover thereof being open.
Figure 3:
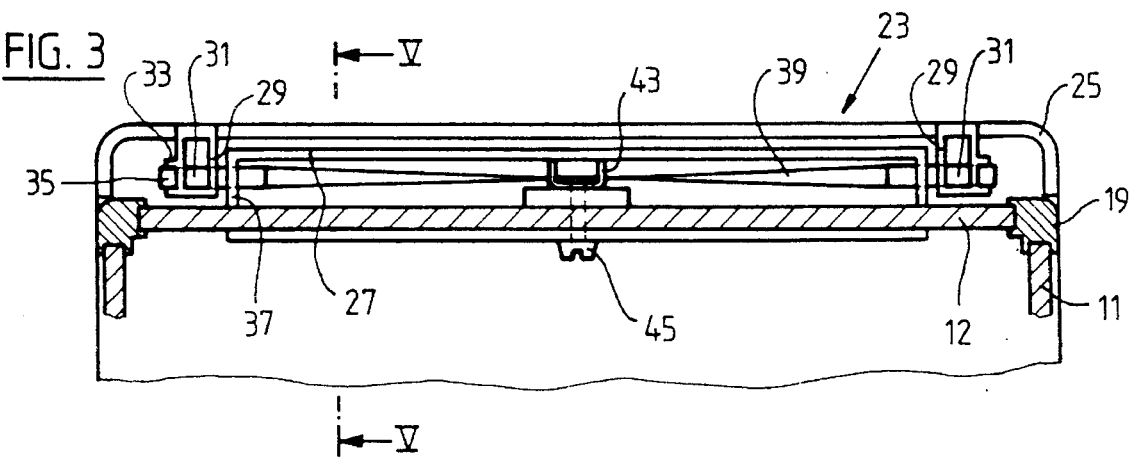
FIG. 3 is a bottom view, on a larger scale, showing the hinge of the draft protection device with the cover thereof being closed.
Figure 4:
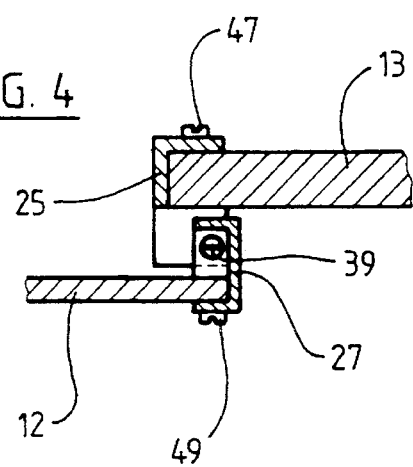
FIG. 4 is a cross-sectional view of the rear wall and the cover and the hinge taken along sectional line IV—IV of FIG. 2.
Figure 5:
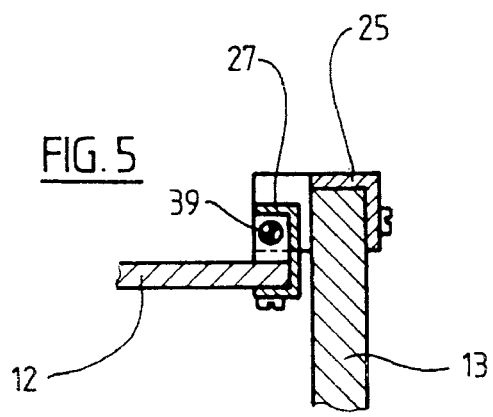
FIG. 5 is a cross-sectional view of the rear wall and the cover and the hinge taken along sectional line V—V of FIG. 3.

The hinge 23 operates as follows. When the cover 13 is open, i.e., when the cover 13 is in the vertical position, the torsion spring 39 is untensioned. Thus, when the cover 13 is in the position illustrated in FIG. 2, the torsion spring 39 is placed loosely in the slot-shaped recesses 41 of the bearing bolts 31 and extends through the slots in the stirrup 43 without imparting a force on the stirrup. The cover 13 remains in this position because its center of gravity is located behind the rear wall 12 which supports the cover 13. As soon as the cover 13 is pivoted forwardly over the upper opening of the draft protection device 9, the bearing bolts 31, which turn together with the cover, rotate the ends of the torsion springs 39 and, as a result, a torsion force is introduced into the torsion spring 39. Consequently, with increasing pivoting angle, the torsion resistance or torsion force in the spring 39 increases and dampens the impact of the cover against the walls 11 and 12 by increasingly compensating for the weight of the cover.

Of course, it is also possible to pre-tension the torsion spring 39 by turning the bearing bolts 39 during the assembly, so that the restoring force acting from the spring onto the cover 13 is increased.

Figure 9:
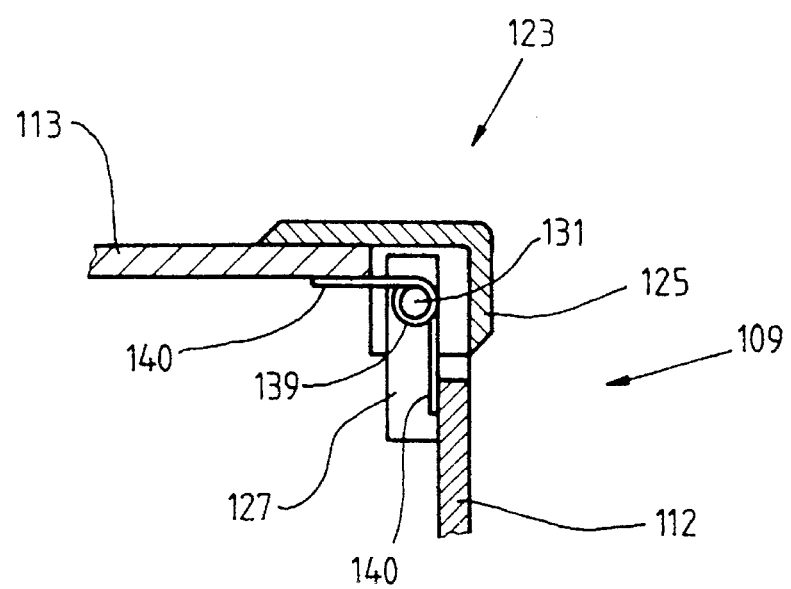
FIG. 9 is a cross-sectional view of the hinge with a different type of spring.

Instead of using a torsion spring 39, in another embodiment of the present invention shown in FIG. 9, a helical spring 139 is slid onto the bearing bolt 131 in the hinge 123. The tangentially projecting ends 140 of the spring 139 rest against the inner side of the cover 113 and against the rear wall 121, respectively. As is the case in the embodiment described above, the hinge 123 includes a pivot part 125 which supports the cover 113 and a support part 127 which is fixedly connected to the rear wall 112.

Figure 6:
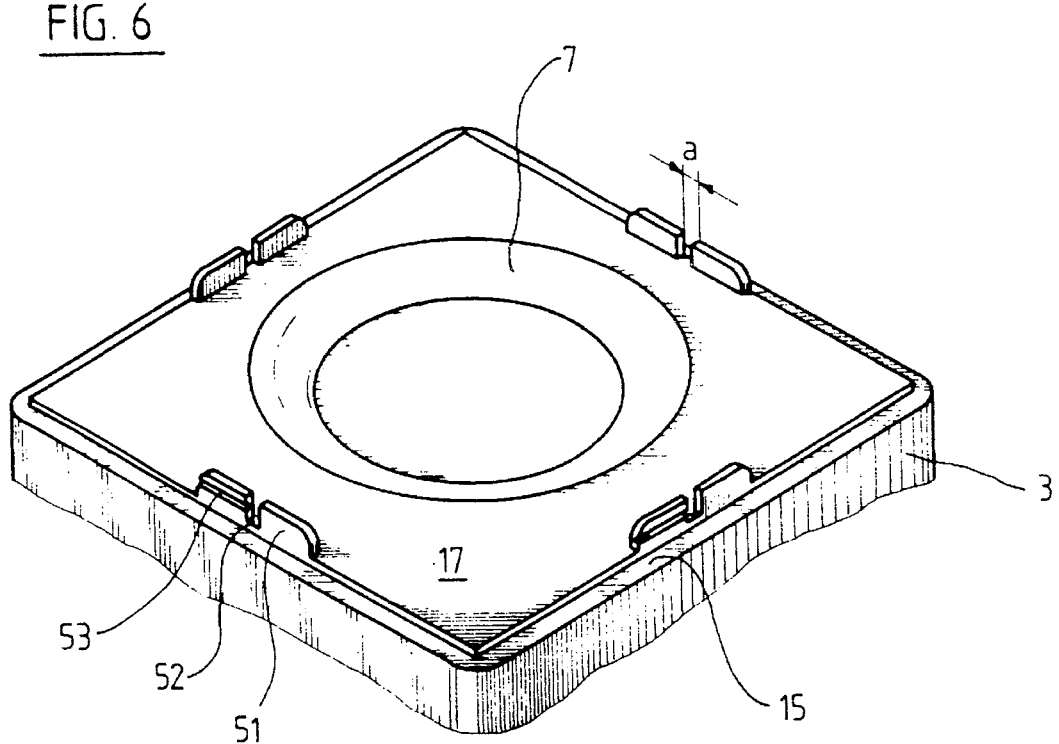
FIG. 6 is a perspective view of the upper surface of the balance.

As illustrated in FIG. 6, a support plate 17 is placed on the upper side 15 of the balance housing 3 and is fixedly connected to the balance housing 3 in a manner which is not illustrated. Pairs of ribs or lugs 51 are provided at the edges of the support plate 17. The ribs or lugs 51 extend vertically upwardly from the support plate 17. The lugs 51 of each pair are spaced apart from each other by a distance a and form a slot 52. The outer surface of at least one of the lugs of the pairs of lugs 51 has a groove, notch or step 53.

Figure 7:
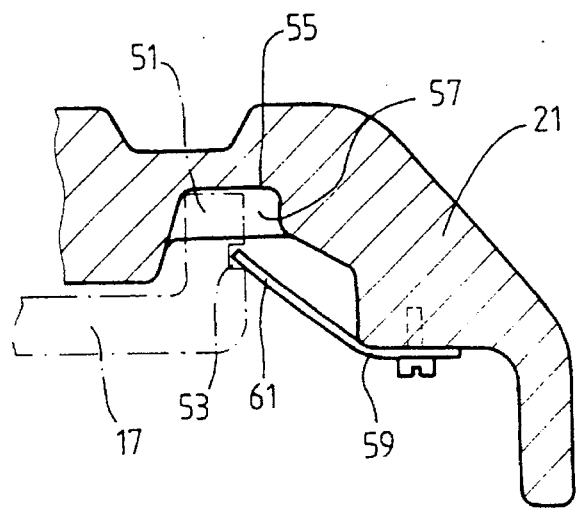
FIG. 7 is a cross-sectional view of the frame of the draft protection device in the area of the locking spring.

The cross-sectional view of FIG. 7 shows that a groove or groove-like recess 55 is provided on the bottom side of the frame 21 of the draft protection device 9. When the draft protection device 9 is placed on the support plate 17, the groove or recess 55 receives the pairs of lugs 51. For positioning the draft protection device 9 on the support plate 17, webs 57 are provided in the grooves 55 extending between the groove walls. The purpose of the webs 57 is to engage between the lugs 51 when the draft protection device 9 is placed on the support plate 17. The webs 57 are dimensioned in such a way that they are placed with little play in the slots 52 between the lugs 51.

A locking spring 59 is fastened on the front side of the draft protection device 9 located opposite the hinge 23. The locking spring 59 is located on the side of the web 57 provided in the recess 55 and the front end 61 of the locking spring 59 projects into the groove 53. The front portion of the locking spring 59 is inclined relative to the vertical, so that, when the draft protection device 9 is placed on the support plate 17, the lug 51 which is being moved into the recess 55 presses back the front portion of the locking spring 59 until the front end 61 of the locking spring 59 snaps into the groove 53. The front end 61 of the locking spring 59 snaps into the groove 53 approximately at the moment when the draft protection device 9 is placed on the support plate 17 or on the surface 15 of the balance housing 3. After the locking spring 59 is engaged in the groove 53, the front of the draft protection device 9 can no longer be spontaneously lifted. Consequently, tilting of the draft protection device is also no longer possible when the cover 13 is opened.

For lifting the draft protection device 9 from the balance housing 3, the draft protection device 9 must be slightly lifted at the rear side thereof, such that the locking spring 59 is guided out of the groove 53 as the draft protection device 9 is being tilted. Subsequently, the draft protection device 9 can be lifted from the housing 3.

Figure 8:
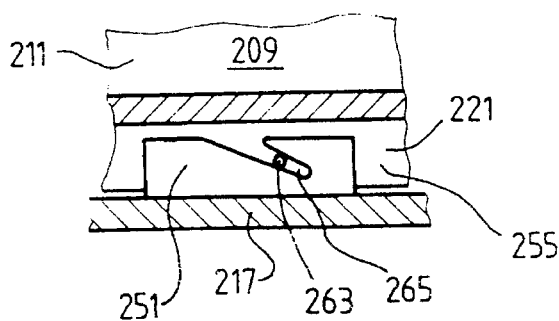
FIG. 8 is a cross-sectional view of the frame of the draft protection device with a different locking device for the draft protection device.

In the embodiment of the locking device for the draft protection device 209 placed on the balance housing 203 illustrated in FIG. 8, the locking spring 59 is replaced by a pin 263 which is mounted in the groove 255 so as to extend between the two groove walls. The pin 263 is engaged by a slot 265 in the lugs 251 extending inclined relative to the horizontal. The slotted lugs 251 replace the pair of lugs 51 shown in FIG. 6, and are fastened on the support plate 217.

The draft protection device 209 is placed on the balance housing 203 in the following manner. The draft protection device 209 is placed from the top onto the lugs 251 and subsequently slides on the inclined path form by the slots 265. As soon as the draft protection device 209 rests on the balance housing 203, the draft protection device 209 can no longer be spontaneously lifted on the operator side of the balance.

If the draft protection device 209 is to be lifted intentionally, the draft protection device 209 is pushed forwardly while being slightly lifted until the pin 263 is no longer engaged in the slot 265.

The invention is not limited by the embodiments described above which are presented as examples only but can be modified in various ways within the scope of protection defined by the appended patent claims.

We claim:

1. A top-loading precision balance with a draft protection device comprising walls having a top and being connected to each other at edges thereof, an opening being defined at the top of the walls, a cover being pivotally fastened by means of a horizontally extending hinge to one of the walls at the top thereof, the cover being pivotable in a direction of movement for closing the opening, further comprising a spring mounted in the hinge, the spring having a spring force directed against the direction of movement for closing the cover, the spring mounted in the hinge being a torsion rod, the torsion rod having first and second ends, the hinge comprising a support part and a pivot part, the support part being fastened to the one of the walls and the pivot part being fastened to the cover, the first and second ends of the torsion rod being fixedly connected to the support part and a portion of the torsion rod between the first and the second ends being fixedly connected to the pivot part, wherein the walls forming the draft protection device have lower edges, further comprising a frame receiving the lower edges of the side walls, the frame having a bottom side defining at least one groove-shaped recess, the balance further comprising a balance housing, lugs being formed on the balance housing, horizontally extending steps being formed in the lugs, a locking spring being attached to the bottom side of the frame so as to extend into the groove-shaped recess, the locking spring engaging the step of one of the lugs when the draft protection device is placed on the balance housing, and wherein the locking spring is mounted on a side of the frame located opposite the hinge of the cover.

2. The balance according to claim 1, wherein the spring has a rectangular cross-section.

3. The balance according to claim 1, wherein the spring has a round cross-section.

4. The balance according to claim 1, wherein the hinge comprises two bearing blocks mounted on the pivot part of the hinge, each bearing block having a bearing bolt fixedly connected thereto, and two spaced apart holding means being fastened to the support part for receiving front ends of the bearing bolts.

5. The balance according to claim 1, comprising a shaft forming an axis of rotation of the hinge, at least one helical spring being mounted on the shaft, the helical spring having tangentially projecting first and second ends, the ends defining an angle relative to each other, the first end of the spring being mounted so as to rest against one of the walls of the draft protection device and the second end of the spring being arranged so as to rest against the cover.

6. The balance according to claim 1, wherein a portion of the locking spring extending into the groove-shaped recess extends at an acute angle relative to the vertical, the draft protection device having a center, and wherein the locking spring is fastened on the bottom side of the frame so as to be directed toward the center of the draft protection device.

7. A top-loading precision balance with a draft protection device comprising walls having a top and being connected to each other at edges thereof, an opening being defined at the top of the walls, a cover being pivotally fastened by means of a horizontally extending hinge to one of the walls at the top thereof, the cover being pivotable in a direction of movement for closing the opening, further comprising a spring mounted in the hinge, the spring having a spring force directed against the direction of movement for closing the cover, the spring mounted in the hinge being a torsion rod, the torsion rod having first and second ends, the hinge comprising a support part and a pivot part, the support part being fastened to the one of the walls and the pivot part being fastened to the cover, the first end of the torsion rod being fixedly connected to the support part and the second end of the torsion rod being fixedly connected to the pivot part, wherein the walls forming the draft protection device have lower edges, further comprising a frame receiving the lower edges of the side walls, the frame having a bottom side defining at least one groove-shaped recess, the balance further comprising a balance housing, lugs being formed on the balance housing, horizontally extending steps being formed in the lugs, a locking spring being attached to the bottom side of the frame so as to extend into the groove-shaped recess, the locking spring engaging the step of one of the lugs when the draft protection device is placed on the balance housing, and wherein the locking spring is mounted on a side of the frame located opposite the hinge of the cover.

8. The balance according to claim 7, wherein the spring has a rectangular cross-section.

9. The balance according to claim 7, wherein the spring has a round cross-section.

10. The balance housing according to claim 7, wherein a portion of the locking spring extending into the groove-shaped recess extends at an acute angle relative to the vertical, the draft protection device having a center, and wherein the locking spring is fastened on the bottom side of the frame so as to be directed toward the center of the draft protection device.

11. A top-loading precision balance with a draft protection device comprising walls having a top and being connected to each other at edges thereof, an opening being defined at the top of the walls, a cover being pivotally fastened by means of a horizontally extending hinge to one of the walls at the top thereof, the cover being pivotable in a direction of movement for closing the opening, further comprising a spring mounted in the hinge, the spring having a spring force directed against the direction of movement for closing the cover, the spring mounted in the hinge being a torsion rod, the torsion rod having first and second ends, the hinge comprising a support part and a pivot part, the support pare being fastened to the one of the walls and the pivot part being fastened to the cover, the first and second ends of the torsion rod being fixedly connected to the support part and a portion of the torsion rod between the first and the second ends being fixedly connected to the pivot part, wherein the first and second ends of the torsion rod are fixedly connected to bearing bolts, and wherein a central portion of the torsion rod is fixedly connected to the cover.

12. A top-loading precision balance with a draft protection device Comprising walls having a top and being connected to each other at edges thereof, an opening being defined at the top of the walls, a cover being pivotally fastened by means of a horizontally extending hinge to one of the walls at the top thereof, the cover being pivotable in a direction of movement for closing the opening, further comprising a spring mounted in the hinge, the spring having a spring force directed against the direction of movement for closing the cover, the spring mounted in the hinge being a torsion rod, the torsion rod having first and second ends, the hinge comprising a support part and a pivot part, the support part being fastened to the one of the walls and the pivot part being fastened to the cover, the first and second ends of the torsion rod being fixedly connected to the support part and a portion of the torsion rod between the first and the second ends being fixedly connected to the pivot part, wherein the walls forming the draft protection device have lower edges, further comprising a frame for receiving the lower edges of the walls, the frame having a bottom side defining a groove, the balance further comprising a balance housing, lugs being mounted on the balance housing, one of the lugs engaging in the groove of the frame, the lugs having slots extending inclined relative to the vertical, and a pin mounted in the frame engaging in the groove when the draft protection device is placed on the balance housing.

13. A top-loading precision balance with a draft protection device comprising walls having a top and being connected to each other at edges thereof, an opening being defined at the top of the walls, a cover being pivotally fastened by means of a horizontally extending hinge to one of the walls at the top thereof, the cover being pivotable in a direction of movement for closing the opening, further comprising a spring mounted in the hinge, the spring having a spring force directed against the direction of movement for closing the cover, the spring mounted in the hinge being a torsion rod, the torsion rod having first and second ends, the hinge comprising a support part and a pivot part, the support part being fastened to the one of the walls and the pivot part being fastened to the cover, the first end of the torsion rod being fixedly connected to the support part and the second end of the torsion rod being fixedly connected to the pivot part, wherein the walls forming the draft protection device have lower edges, further comprising a frame for receiving the lower edges of the walls, the frame having a bottom side defining a groove, the balance further comprising a balance housing, lugs being mounted on the balance housing, one of the lugs engaging in the groove of the frame, the lugs having slots extending inclined relative to the vertical, and a pin mounted in the frame engaging in the groove when the draft protection device is placed on the balance housing.

14. A top-loading precision balance with a draft protection device comprising walls having a top and being connected to each other at edges thereof, an opening being defined at the top of the walls, a cover being pivotally fastened by means of a horizontally extending hinge to one of the walls at the top thereof, the cover being pivotable in a direction of movement for closing the opening, further comprising a spring mounted in the hinge, the spring having a spring force directed against the direction of movement for closing the cover, the spring mounted in the hinge being a torsion rod, the torsion rod having first and second ends, the hinge comprising a support part and a pivot part, the support part being fastened to the one of the walls and the pivot part being fastened to the cover, the first and second ends of the torsion rod being fixedly connected to the support part and a portion of the torsion rod between the first and the second ends being fixedly connected to the pivot part, wherein the walls forming the draft protection device have lower edges, further comprising a frame receiving the lower edges of the side walls, the frame having a bottom side defining at least one groove-shaped recess, the balance further comprising a balance housing, lugs being formed on the balance housing, horizontally extending steps being formed in the lugs, a locking spring being attached to the bottom side of the frame so as to extend into the groove-shaped recess, the locking spring engaging the step of one of the lugs when the draft protection device is placed on the balance housing, and wherein the locking spring is mounted on a side of the frame located opposite the hinge of the cover.

* * * * *